US005587089A

United States Patent [19]

Vogel et al.

[11] Patent Number: 5,587,089

[45] **Date of Patent: *Dec. 24, 1996**

[54] WATER PURIFICATION AND DISPENSING SYSTEM

[75] Inventors: Gerald A. Vogel, Willmar; Joseph H. Tholen, Waconia, both of Minn.

[73] Assignee: J. Vogel Premium Water, St. Cloud, Minn.

[ * ] Notice: The term of this patent shall not extend beyond the expiration date of Pat. No. 5,427,682.

[21] Appl. No.: 272,784

[22] Filed: Jul. 8, 1994

[51] Int. Cl.[6] .......... B01D 17/12

[52] U.S. Cl. .......... 210/164; 210/91; 210/192; 210/542; 210/767; 222/1; 222/41; 222/189.06; 422/24; 422/186.3; 422/303

[58] Field of Search .......... 210/764, 767, 210/806, 91, 192, 257.2, 259; 422/24, 303, 1, 302; 222/1, 2, 129.1, 189, 148, 189.06, 189.11; 134/137, 109, 110, 157

[56] References Cited

U.S. PATENT DOCUMENTS

| | | | |
|---|---|---|---|
| 200,608 | 2/1878 | Foley | 210/542 |
| 807,468 | 12/1905 | Hunter | 422/303 |
| 1,283,071 | 10/1918 | Cooper | 222/1 |
| 4,928,853 | 5/1990 | Isham et al. | 222/129.1 |
| 4,950,133 | 8/1990 | Sargent . | |
| 5,108,590 | 4/1992 | DiSanto | 210/257.2 |
| 5,112,477 | 5/1992 | Hamlin | 222/189 |
| 5,139,127 | 8/1992 | Ficken et al. | 222/2 |
| 5,427,682 | 6/1995 | Vogel et al. | 210/257.2 |
| 5,443,739 | 8/1995 | Vogel et al. | 210/257.2 |
| 5,443,789 | 8/1995 | Vogel et al. | 210/257.2 |

FOREIGN PATENT DOCUMENTS

| | | | |
|---|---|---|---|
| 1212382 | 11/1970 | United Kingdom | 222/2 |

*Primary Examiner*—Joseph W. Drodge
*Attorney, Agent, or Firm*—Merchant, Gould, Smith, Edell, Welter & Schmidt, P.A.

[57] ABSTRACT

A system for purifying water and washing and filling a container with the purified water is disclosed. The system includes an appartus comprising a water inlet system, a water purification system, a container washing system, a container filling system, an auxiliary function system, a mineralization system and an ozonating system. The apparatus includes compartments, where a container is washed and filled within a single compartment. The apparatus also includes a cap washing system.

23 Claims, 13 Drawing Sheets

WATER PURIFICATION AND DISPENSING SYSTEM

FIELD OF THE INVENTION

This invention relates to a point-of-sale water purification and dispensing system, comprising an apparatus which purifies previously unpurified water from a supply source, washes a container with the purified water, and fills the container with purified water once washing is complete.

BACKGROUND OF THE INVENTION

Consumers are becoming more aware of the deterioration of the quality of the water supplies from their city or rural water system, or private well system. Many retailers currently sell bottled water and other beverage products in off-the-shelf containers. Some retailers use point-of-purchase dispensers that purify water and dispense it into a container provided by the consumer. Other people have bottled water delivered to their homes or business, often in 5 gallon containers designed to fit on a water cooler. The market for these forms of bottled water is emerging to the point where purified water is a basic commodity.

One problem with any of these sources of bottled water is product quality. Presently there is a concern that bottled water may not be much better than tap water. On top of this, the various distribution systems have drawbacks.

Where bottled water is sold off the shelf, there are costs involved in transporting the water from the bottled water plant, through the wholesale and retail distribution system, storing the water at warehouses and in the back room at retailers, and stocking shelves, not to mention the shelf space taken up by the product. Also, the time between when the water is produced and bottled and when the consumer purchases it may be a period of weeks and even months. Of course, leaking bottles also cause a problem, such as when a pallet of cases of bottled water are stacked in a warehouse or the back room of a store.

Delivered bottled water is generally more expensive because of the delivery costs, and is also subject to some of the disadvantages described above. In addition, the delivery process itself has disadvantages, such as the scheduling of delivery times, and the possibility that delivery personnel or equipment will track in mud or dirt into the office or other place of use.

One problem of water quality is of course when the purification is not complete. However, if all impurities are removed from the water, it may have a reduced pH that then causes the water to leach minerals or other harmful components from processing equipment, storage containers, and even the body when the water is consumed. It is a common experience to open a container of bottled water and find that it has acquired an off taste, especially when stored in some plastic containers.

Another problem existing with delivered water is that it wastes resources. Initially, fuel is needed to truck the bottled water from the processing plant to the consumers. Typically, the containers in which the water is purchased are not reused and end up in landfills, where their final disposal requires the expenditure of energy. Even if recycled, by plastic recycling or the like, fuel is consumed in transporting the containers to the recycling plant.

Point-of-sale dispensing of water overcomes some of the drawbacks of other bottled water distribution systems, but also presents new problems. First, because the dispensing equipment is used by the public, it is subject to contamination. Also, even if the water is purified, there is no control over the cleanliness of the container into which it is dispensed. Often, to reduce costs, many water purification and dispensing systems have a small processing capacity coupled with a storage tank. Thus, water is purified on a slow, continuous basis, but is stored to meet demand. These large storage systems present long holding times that are not conducive to water purity, and if the tanks are not sealed, to the possibility of contamination.

For example, one point-of-sale dispensing machine which lacks most of these problems is disclosed in U.S. patent application Ser. No. 07/947,125, now U.S. Pat. No. 5,427, 682. This application discloses a water purification and dispensing apparatus which purifies municipal water. The device has two separate compartments. The first compartment is for receiving an empty container in an inverted position for washing while the second compartment receives the container in an upright position for filling with purified water.

SUMMARY OF THE INVENTION

The present invention improves on the prior art by providing a water purification and dispensing apparatus which washes and fills a container. The apparatus comprises an inlet which connects to a supply source of unpurified water, a water purification system for purifying the unpurified water, and a means for rotating the container between upright and inverted positions for washing and filling. The rotating means receives a container in an upright position and rotates it to an inverted position, where means for directing purified water inject the purified water into the inverted container, washing it. Once washed, the container is returned to the upright position where it is filled with purified water.

In another aspect of the invention, an ozonization system is disclosed for adding ozone to the purified water before, during and after, the washing and filling functions. The ozone provides sterilization by killing bacteria which may be present in the purified water in the system or the filled container.

BRIEF DESCRIPTION THE DRAWINGS

The present invention will be described with reference to the accompanying drawings, wherein like reference numerals identify corresponding or like components.

Figure 9:
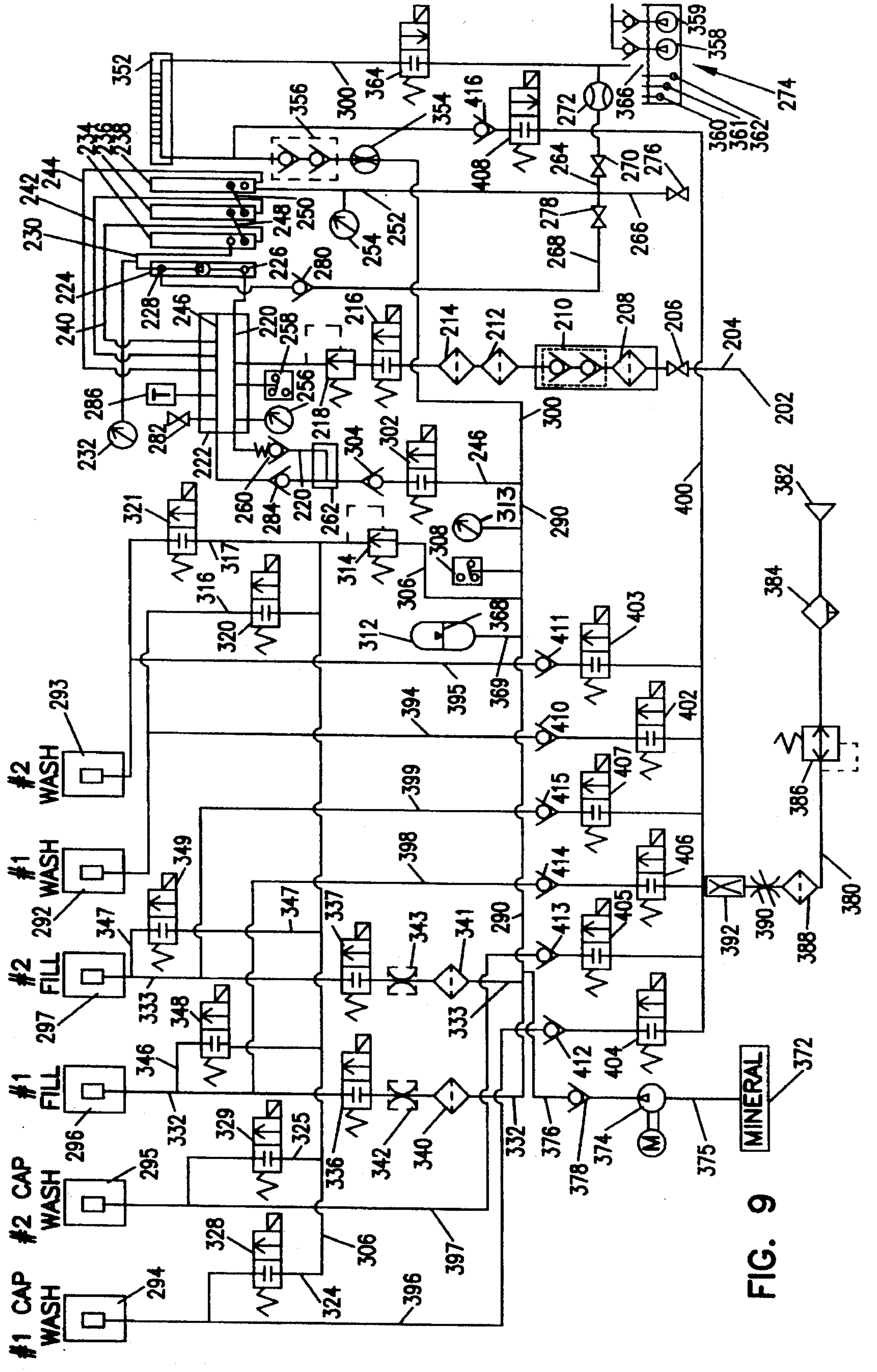
Figure 10:
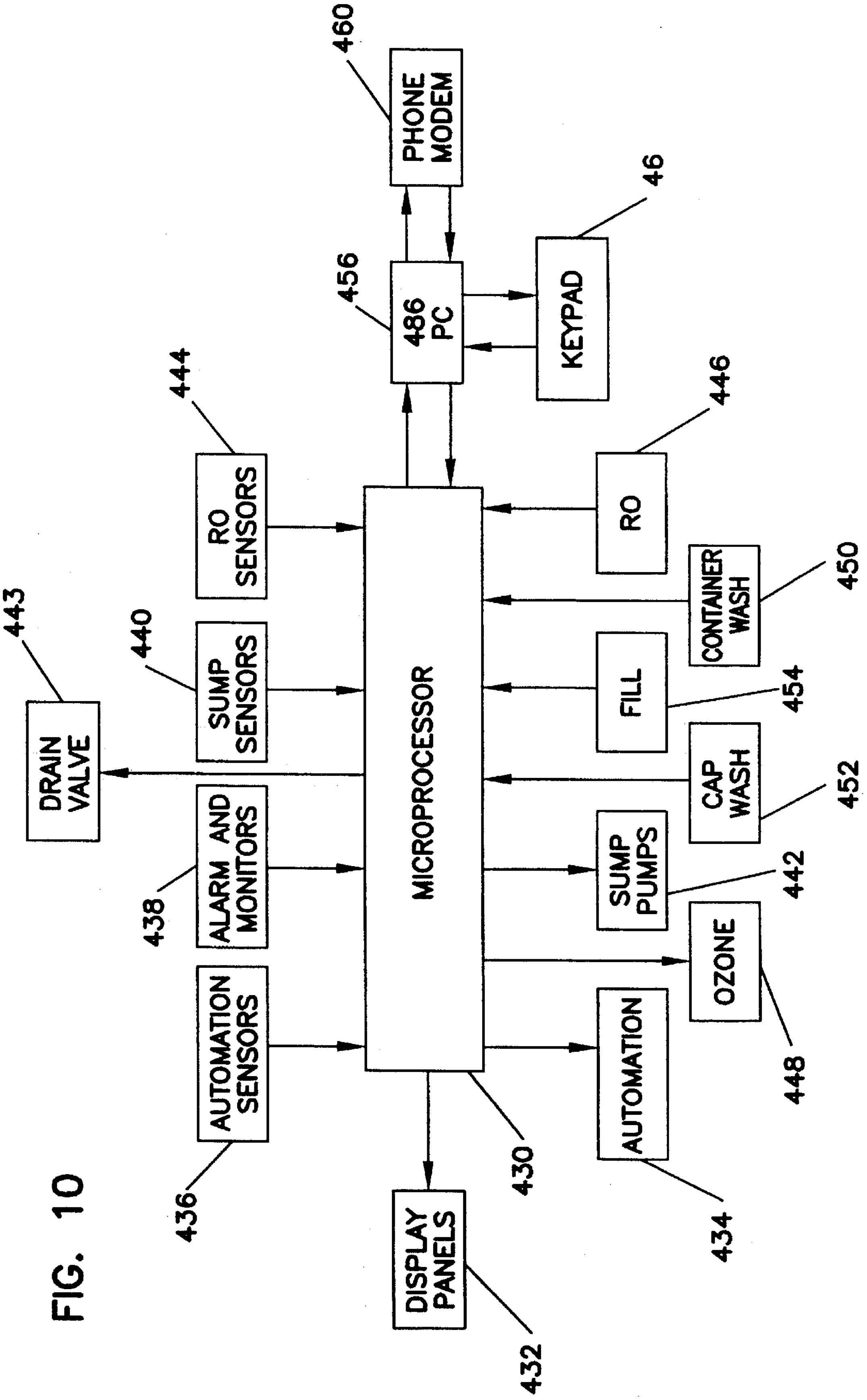
Figure 11:
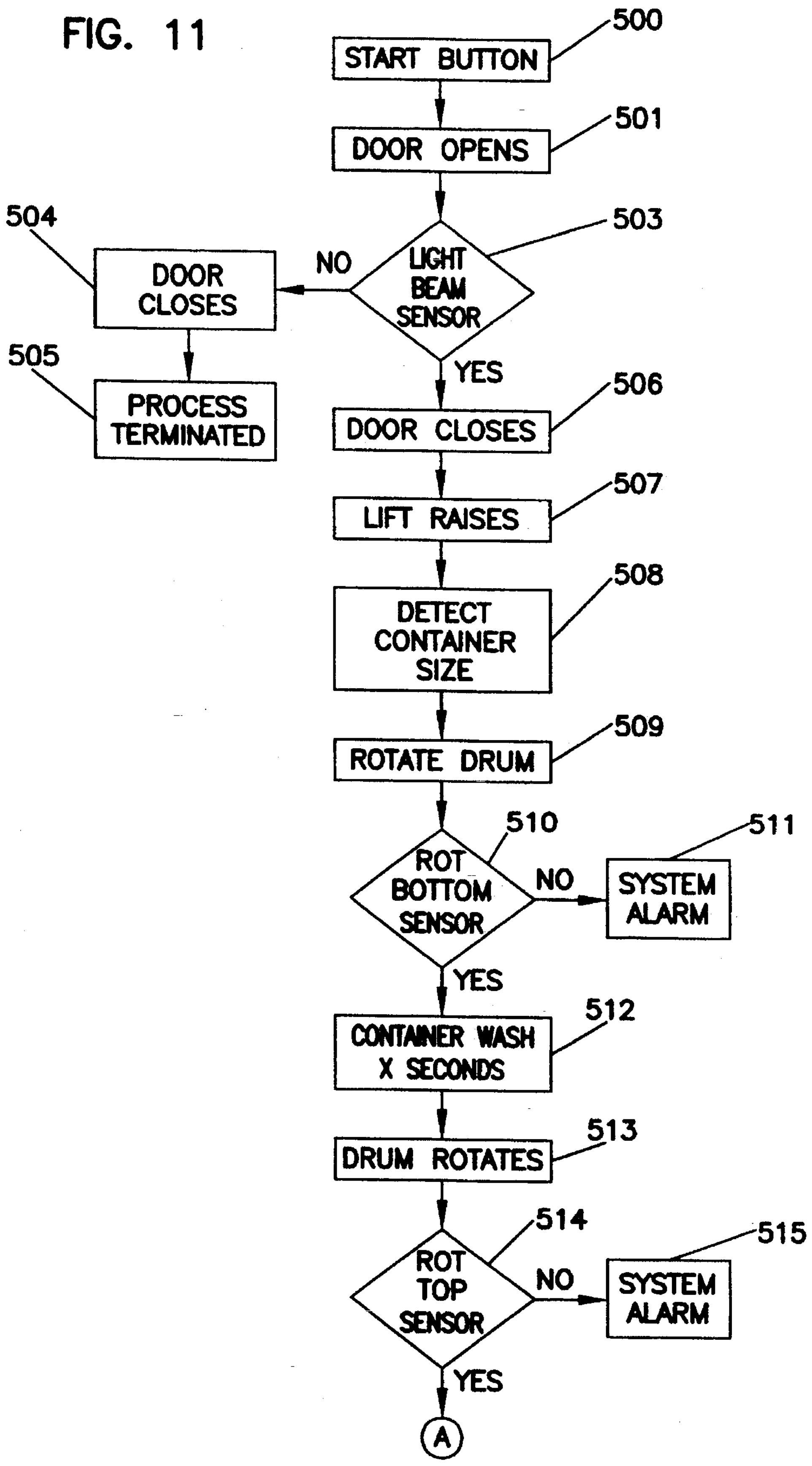
Figure 12:
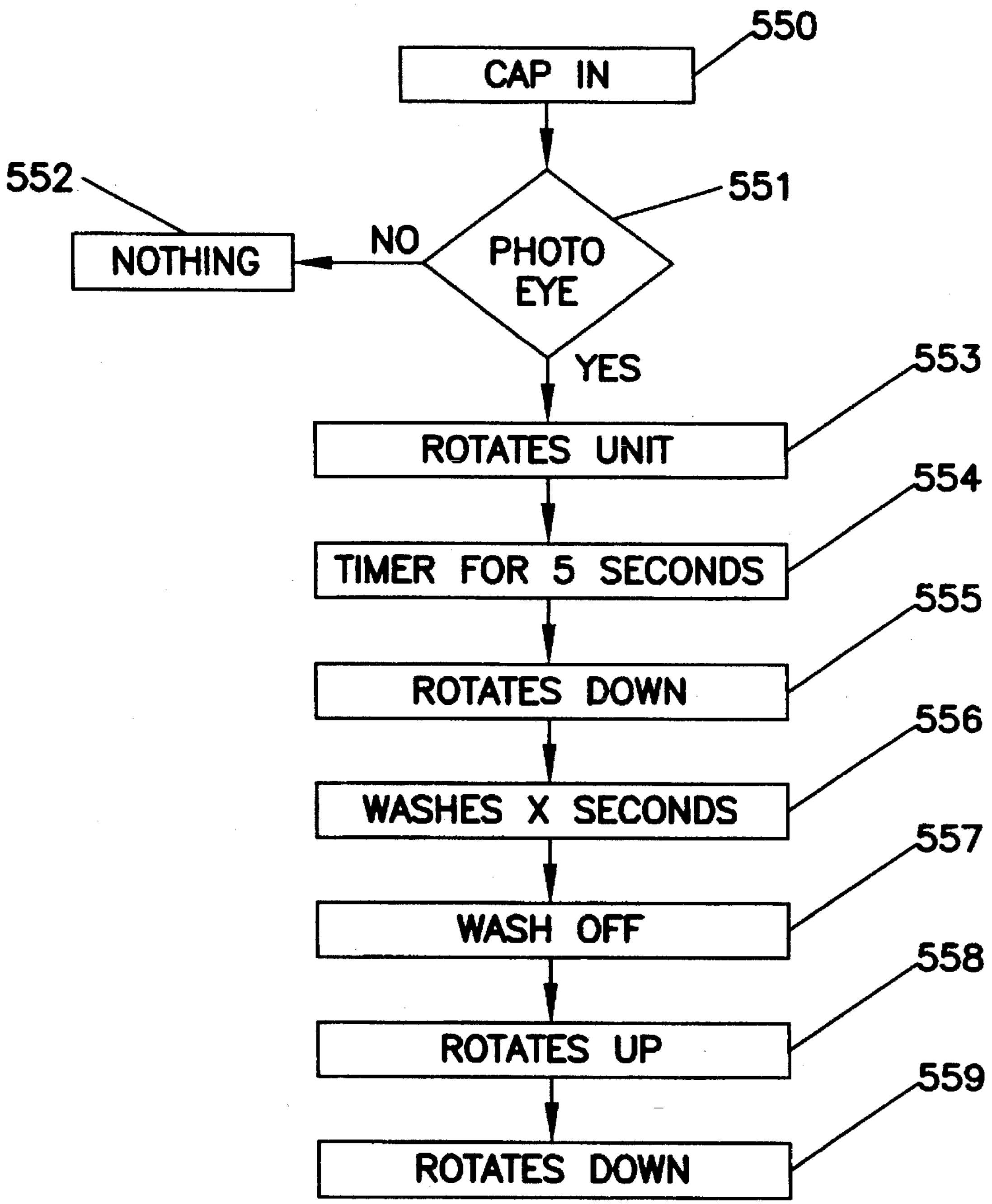
Figure 13:
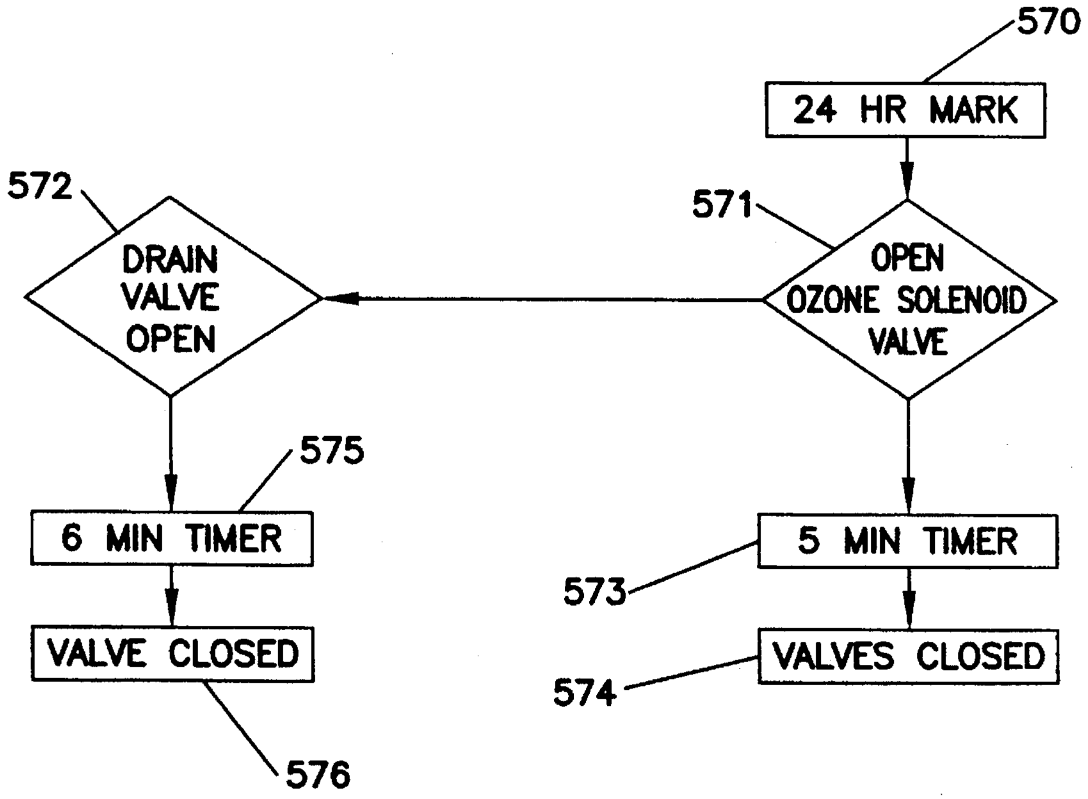
Figure 14:
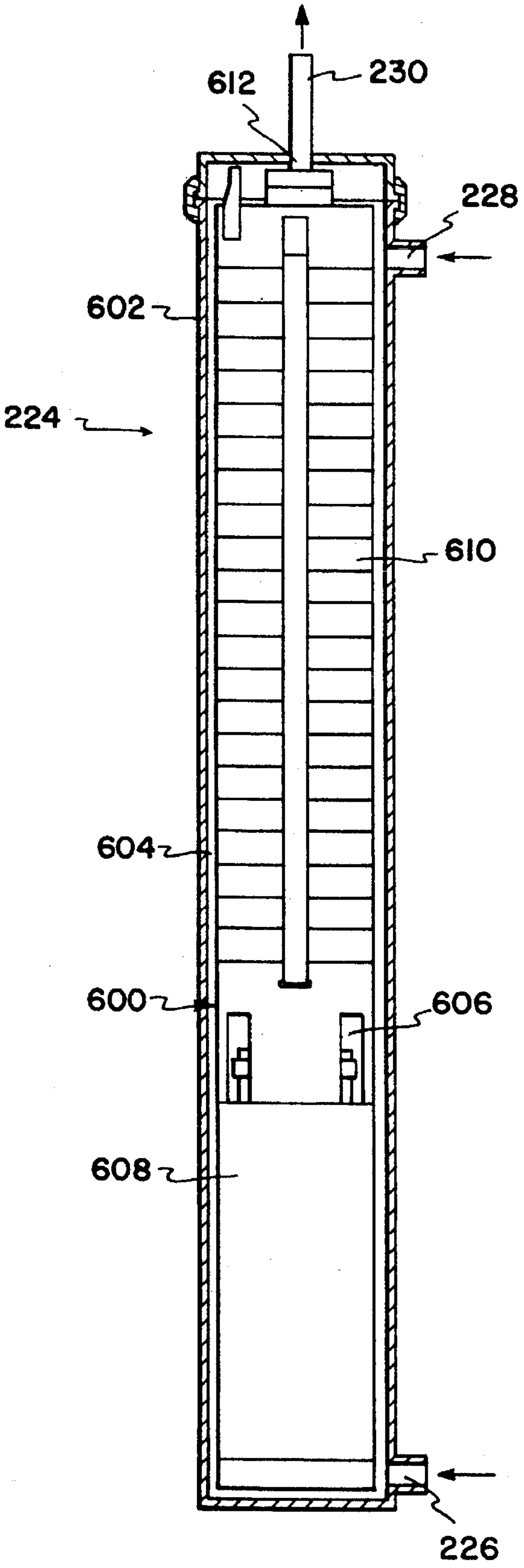

FIGS. **8*a*–8*d*** are cross sectional cut away views of a cap washing unit (cap washer) of the present invention, showing the operational cycle thereof;

FIG. 9 is a schematic drawing of the water flow components of the apparatus of the invention;

FIG. 10 is a block diagram of a preferred system for implementing the present invention;

FIGS. 11 and **11*a*** are a flow chart detailing the operation of the container washing unit and container filling unit of the apparatus as controlled by a microprocessor of the invention;

FIG. 12 is a flow chart detailing the operation of the cap washing unit (cap washer) of the apparatus as controlled by a microprocessor of the invention;

FIG. 13 is a flow chart detailing the operation of the auxiliary functioning of the apparatus as controlled by a microprocessor of the invention; and FIG. 14 is a cross-sectional view of a preferred pump unit used in the apparatus of the invention.

DETAILED DESCRIPTION OF THE DRAWINGS

Figure 1:
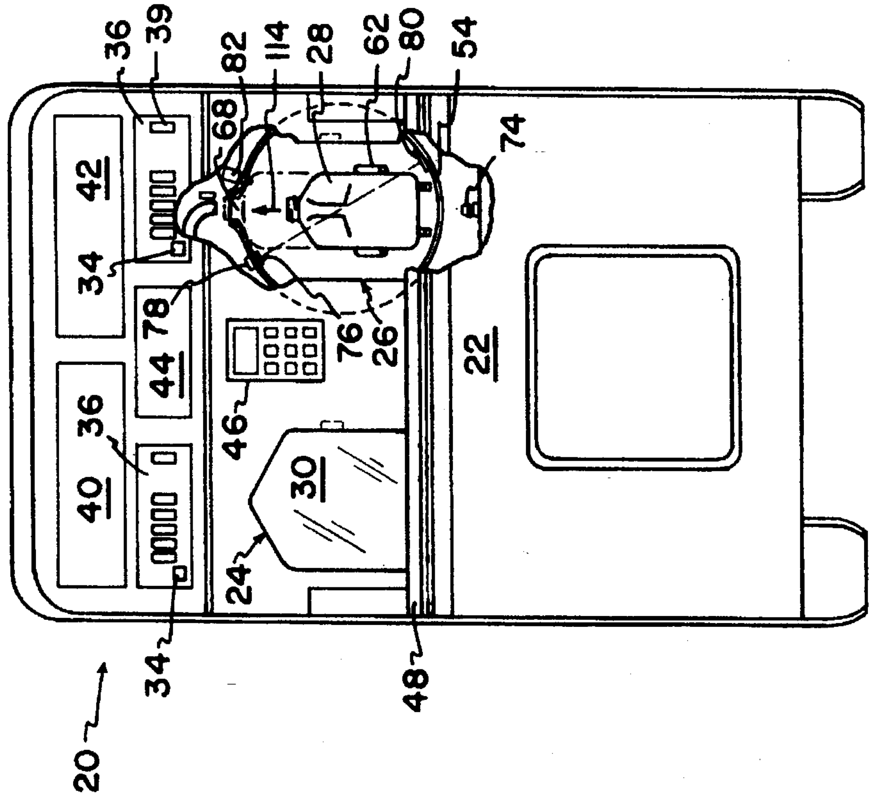

Turning now to FIGS. 1–6, and in particular FIG. 1, there is shown the apparatus 20 of the invention in its various cycles of operation. The apparatus 20 comprises a cabinet 22 housing various water flow components of the invention (FIG. 9). The cabinet 22 also includes two compartments 24, 26, each compartment 24, 26 designed for both washing and filling a container 28. While portions of each compartment are shown, this is for illustration purposes only, as the compartments and the components contained therein are identical.

Each compartment 24, 26 includes a sliding door 30, preferably made of a transparent plexiglass or other see-through material, which provides access to these compartments 24, 26, and can be opened and closed by pressing the respective start buttons 34 on the indicator panels 36, preferably located above the compartments 24, 26. The start buttons 34 are, in turn, connected to a conventional drive mechanism (not shown) for opening and closing the sliding doors 30. These start buttons 34 also serve to activate the washing and filling processes described below. The indicator panels 36 are connected to a microprocessor 430 (FIG. 10) and may include lit display plaques 37, such as those to indicate the presence or absence of the container in the compartment, the empty or full status of the container, container washing, cap washing, container filling, and an indicator signifying completion of the process, i.e., a plaque with the words "THANK YOU". There is also an alarm plaque 39 (the actual alarm being inside the cabinet 22), set off from the other plaques on the indicator panel 36. The indicator panels 36 may also include an LED Display for reporting the amount of water used, purchased or distributed.

Additional display panels 40, 42, 44 for displaying advertising, prices or other information may be located above the compartments 24, 26. Between the compartments 24, 26 is a customer interface key pad 46. This allows a customer, for example, to code access their account to obtain water, check their purchase amounts for a period of time, see what time water was purchased and the like. This customer interface keypad 46 is connected to the microprocessor in the apparatus 20. While code access is preferred, the apparatus 20 can also be designed for coin, token or dollar bill activated devices, which are well known in the art.

The apparatus 20 also includes a countertop 48 on which containers can be placed. Cap washing units 50, 52, also known as cap washers, extend outward from the cabinet 22 in close proximity to the compartments 24, 26 along the countertop 48. The cap washing units (cap washers) 50, 52 are described in detail in FIGS. 8*a*–8*d* below.

Turning specifically to the compartments 24, 26, where both washing and filling of containers 28 takes place in each individual compartment, there are drums 54, 56 (FIG. 7), which are rotated by their respective drive mechanisms 58, 60 (FIG. 7), and are subject to microprocessor control, but can be overridden manually. Each drum 54, 56 (FIG. 7) includes a fork 62, movable along a track 64 by a lift 66 (FIG. 7), which attaches to the fork 62 at the rear side of the drum 54. The fork 62 is shaped to receive and firmly hold a container 28. Additionally, this fork shape lends itself to being able to hold a variety of containers as well.

Figure 2:
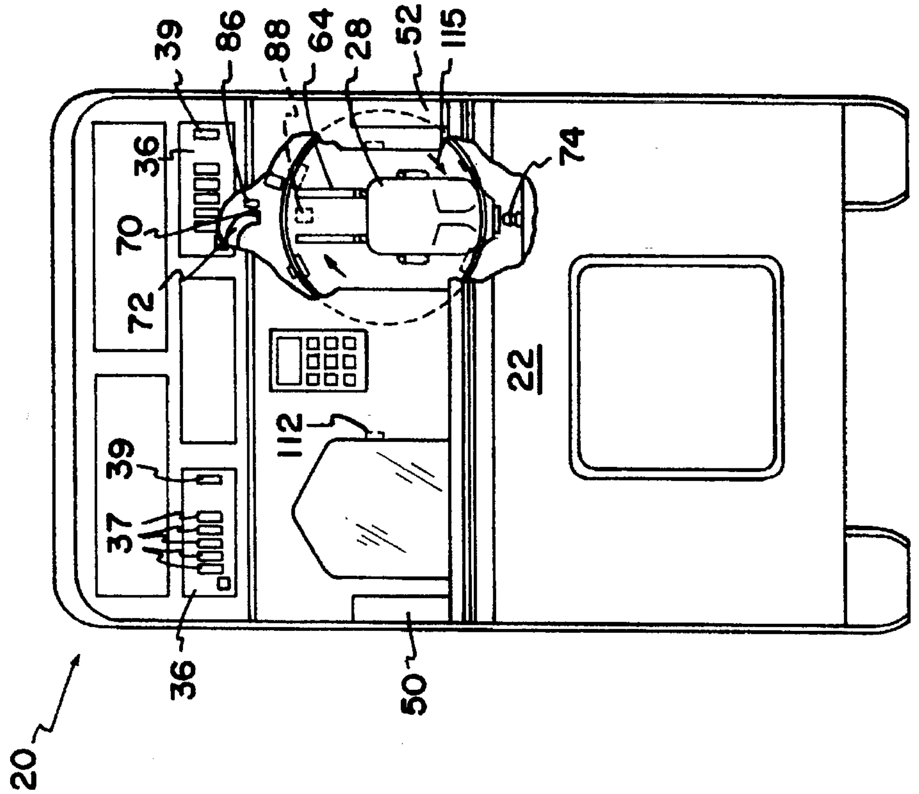
FIGS. 1–6 are front views of the preferred water purification and dispensing apparatus of the present invention, showing the operational cycle thereof.
Figure 3:
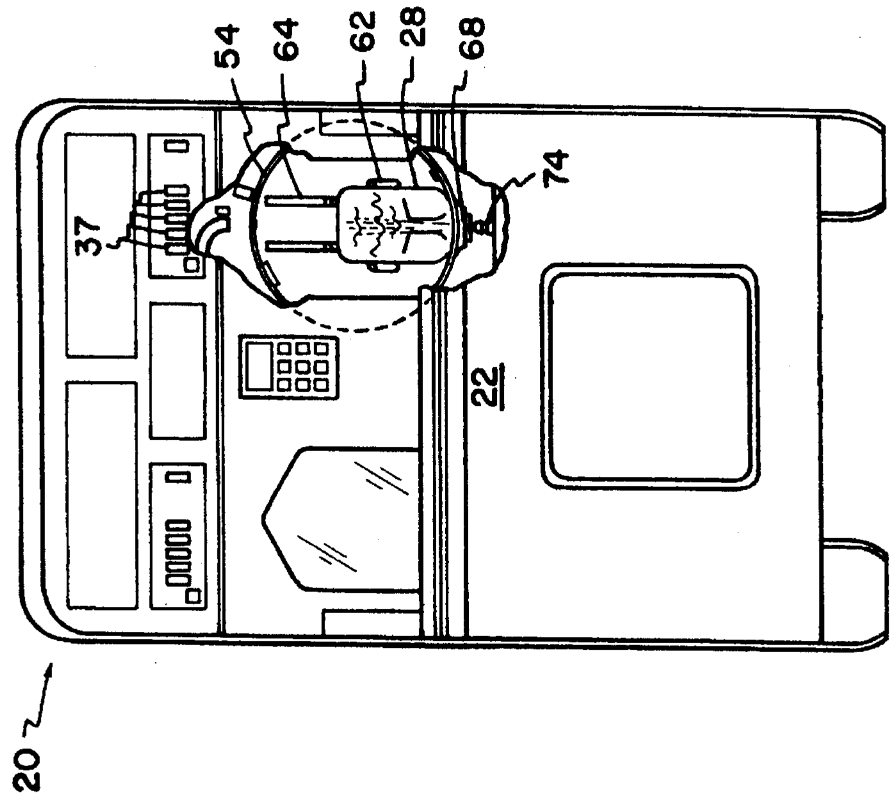

The drum 54, illustrated in detail, includes an opening 68 shaped to accommodate the neck of the container 28, and in particular, only the outside portion of the neck, so as to avoid any possible contamination on the inside of the container. The container 28 is held in place upon rotation and during washing and filling as its neck is firmly engaged in the opening 68. A filling nozzle 70 at the end of the fill hose 72 fed by the fill sub-line 332 (FIG. 9) of the filling unit 296 (FIG. 9), is positioned above the drum 54 and over the opening 68, in line with the container neck in order to fill the container 28 when desired. Similarly, a spraying nozzle 74 from the container washing unit 292 (FIG. 9) is located below the drum 54 and is line with the opening 68 when washing the container 28 is desired, as shown in FIGS. 2 and 3. The drum 54 also includes an opening 76 for a light beam sensor unit 78 which sends a light beam off a reflector 80 on the drum 54 to detect the presence or absence of a container 28 in the compartment and in particular, whether the container 28 is on the fork 62. The light beam sensor unit 78 is preferably controlled by the microprocessor.

Figure 4:
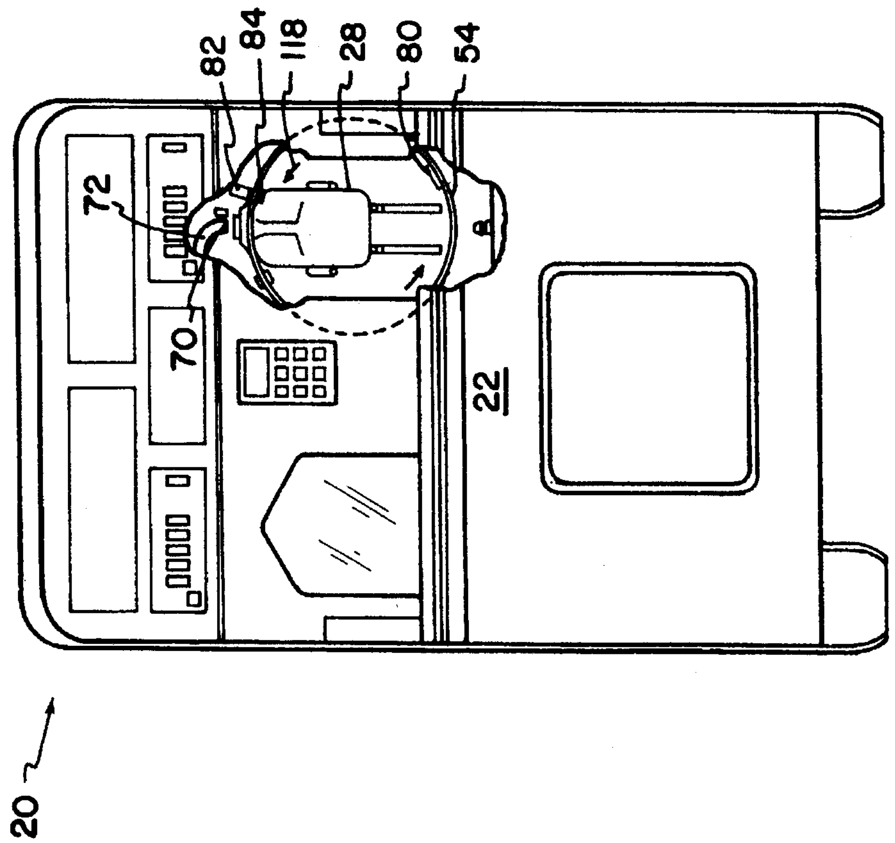
Figure 5:
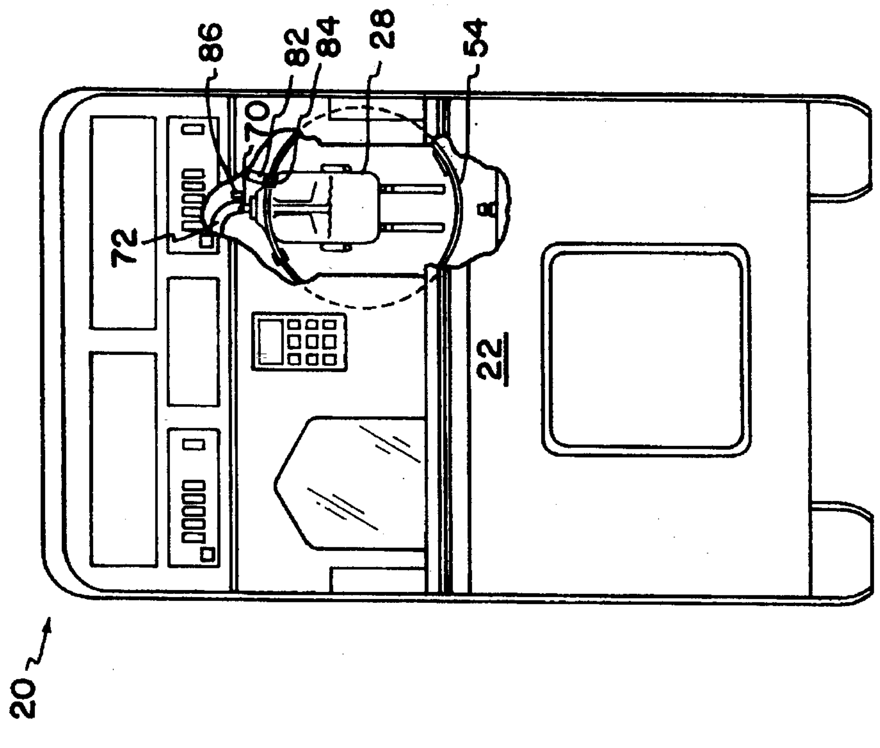

A proximity switch 82 is mounted within the cabinet 22 such that it moves through a separate opening 84 in the drum 54 when the container 28 is in the filling positions (FIGS. 4 and 5). This proximity switch 82 is connected to the microprocessor, and emits a magnetic field to sense the level of water in the container 28. Once the water level in the container 28 is sensed, the proximity switch 82 signals the microprocessor to close the solenoid valves 336, 337 (FIG. 9) of the fill sub-lines 332, 333, ending the fast fill portion of the filling step. The preferred proximity switch 82, is an E2K-C25ME1 unit from Omron Electronics, Inc., One East Commerce Drive, Schaumberg, Ill. 60173.

The system may also include a fiber optic photo eye sensor 86, connected to the microprocessor, for detecting the water level in the container neck, added during the top-off portion of the filling step, the top off portion beginning after the fast-fill portion of the filling step has ceased. Once a certain level has been reached, during the top-off portion, the photo eye sensor 86 signals the microprocessor, which terminates the top-off portion of the filling step, such that the consumer receives a full container. This photo eye sensor 86 may be eliminated, provided there are preset times in the microprocessor for the top-off filling portions for various container sizes.

Figure 7:
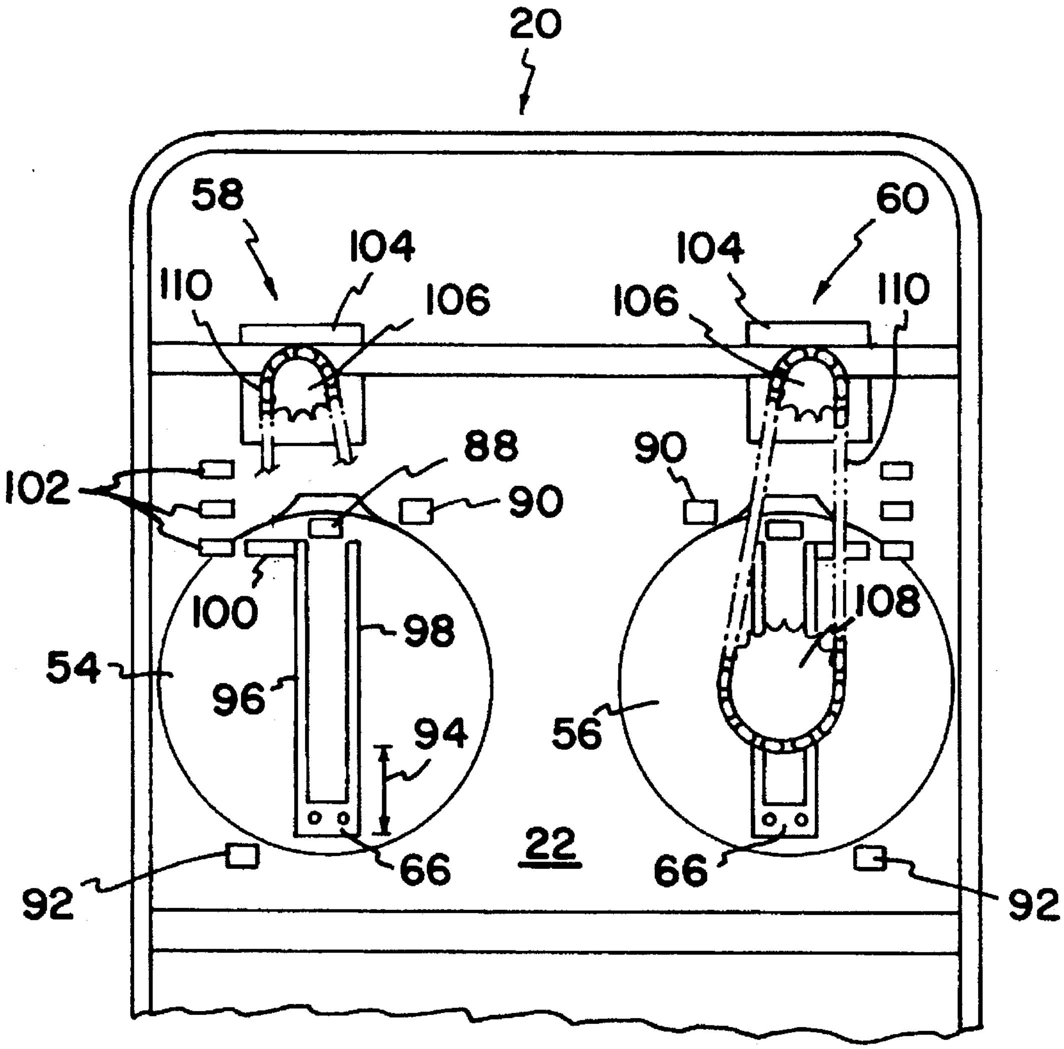
FIG. 7 is a partially cut away rear view of the apparatus of the invention.

Reference is now made to FIG. 7, where additional sensing mechanisms along with drum drive mechanisms 58, 60 are shown. While only portions of sensing mechanisms and one drum drive mechanism is shown, this is for illustration purposes only, as both drums and the compartments they are contained within are identical and include all of the mechanisms described herein.

On the back of each drum 54, 56 is a magnet 88 positioned such that when the drums 54, 56 hold the container 28 in an upright position, the magnet 88 can be sensed by a rotate top sensor 90, located within the cabinet 22. This magnet 88 can also be detected by a rotate bottom sensor 92, located within the cabinet 22 when the drums 54, 56 hold the container in an inverted position. Both the rotate top sensors 90 and the rotate bottom sensors 92 are connected to the microprocessor.

The lift 66 includes an air cylinder (not shown), for lifting the fork 62 (FIGS. 1–6), in the direction of the arrows 94.

This air cylinder for the lift 66 is controlled by the microprocessor. The lift 66 includes guide poles 96, 98 which enable the fork 62 to be lifted up straight, to avoid the container becoming unlevel, leading to the water spilling out of the container. One guide pole 96 includes a magnet 100, which moves past three reed switches 102, placed at different height intervals within the cabinet 22, along the path of the guide pole 96. The reed switches 102 are connected to the microprocessor and the positioning of each reed switch 102 registers the size of the container (the smaller the container, the farther upward the fork 62, and ultimately the magnet 100 on the guide pole 96 can travel), so that the washing step, filling step, and optional additional ozone blow step (all steps which are explained below) are timed in proportion to the size of the container. Generally, the smaller the container, the shorter the time for each step, since smaller volume containers would use less water for each step. The specific times for each step are preset in the microprocessor.

The drum drive mechanisms 58, 60 are used to rotate the drums 54, 56. These drum drive mechanisms 58, 60 include motors 104 which drive the respective first sprockets 106. The second sprockets 108 extend from the drums 54, 56 which are connected to the first sprockets 106 by cables 110. Motors 104 or pneumatic cylinders rotate the drums 54, 56 and are controlled by the microprocessor. While this is the preferred drum drive mechanism, other equivalent microprocessor controlled or manual drive mechanisms could also be used. Additionally, these drum drive mechanisms 58, 60 can be manually overridden if the need arises.

Turning back to FIGS. 1–6, there is shown an operating cycle for the apparatus 20 of the invention, where a container is washed and filled. Specifically, this operating cycle includes a container washing step and a container filling step. The filling step preferably has two portions, a fast fill portion, for filling a majority of the container, and a top-off portion, for filling the container neck and container upper end, if the need arises. The top-off portion occurs at a slower rate than the fast fill to avoid water from splashing out of the container, as would occur with a fast fill rate due to the geometry of the container neck. As a result of these two fill rates, the consumer receives a full container. The operational cycle is preferably controlled by a software program, such as that described in accordance with FIGS. 11 and 11*a* below.

FIG. 1 shows the first step of the operating cycle. The start button 34 has been pushed, which opens the door 30 of the compartment 26, providing access to the drum 54. The container 28 has been received in the compartment 26, and rests on the fork 62. Light beam sensor unit 78 senses the presence of the container 28 and signals this to the microprocessor, which sends signals to a drive mechanism (not shown) which closes the door 30 of the compartment 26. Once the door 30 has been closed, a safety switch 112 signals the microprocessor that the door closing condition is sufficient. Upon a signal from the microprocessor, the fork 62, is lifted upward along the track 64 such that the container 28 moves upward in the direction of the arrow 114, to the position (shown in phantom) where the neck of the container 28 is engaged in the drum opening 68. Once the fork 62 has reached its maximum height, the reed switches 102 (FIG. 7) report their conditions to the microprocessor, and the container size is determined, such that the washing, filling (fast fill portion and top off portion), and optional ozone blow steps will be timed in proportion to the container size.

Once the container 28 is in this engaged position, the microprocessor signals the respective drum drive mechanism 58, 60 (FIG. 7) which rotates the container 28 (in the direction of the arrows 115) approximately 180° placing the drum opening 68 and opening of the container 28 directly over and in line with the spraying nozzle 74, as shown in FIG. 2. The rotate bottom sensor 92 (FIG. 7) senses the position of the magnet 88 to detect the position of the drum 54, to make sure the rotation is complete, whereby the container 28 is in position for washing. Once the rotation is complete, the container 28 is washed with purified water, as shown in FIG. 3.

Once the washing is complete, as timed by the microprocessor, the microprocessor signals the drum drive mechanism 58 (FIG. 7) to rotate the container 180° in the direction of the arrows 118, to the filling position, as shown in FIG. 4. In this position, the neck of the container 28 remains retained in the drum opening 68, which is in line with the filling nozzle 70 of the container filling unit 296 (FIG. 9). This alignment is detected by the rotate top sensor 90 (FIG. 7), which senses the position of the magnet 88 to detect the position of the drum 54, to make sure the rotation is complete, whereby the container is in position for filling. With the container 28 properly aligned, the microprocessor signals the proximity switch 82, which moves through the opening 84 in the drum 54 to sense the fill level.

Filling, as shown in FIG. 5, begins upon a signal from the microprocessor. This filling is timed according to parameters including container volume and/or fluid flow rates (also container mass or weight), which are preset in the microprocessor. The fill level is sensed by a proximity switch 82, which once a certain water level has been reached in the container, signals the microprocessor, which slows the fluid flow rate through the filling nozzle 70 for topping off the container. The level of the top-off fill is then detected by a fiber optic photo eye sensor 86, which signals the microprocessor to terminate this top-off portion, or alternately, this top-off fill portion could be timed, as preset in the microprocessor in accordance with the requisite container size.

While the filling step is preferably achieved with two fill rates, the top-off fill portion could be eliminated totally if so desired. Additionally, the fast fill could be eliminated if desired and the container filled at the slower or top-off rate. Both of these filling methods can be programmed into the microprocessor if desired.

Figure 6:
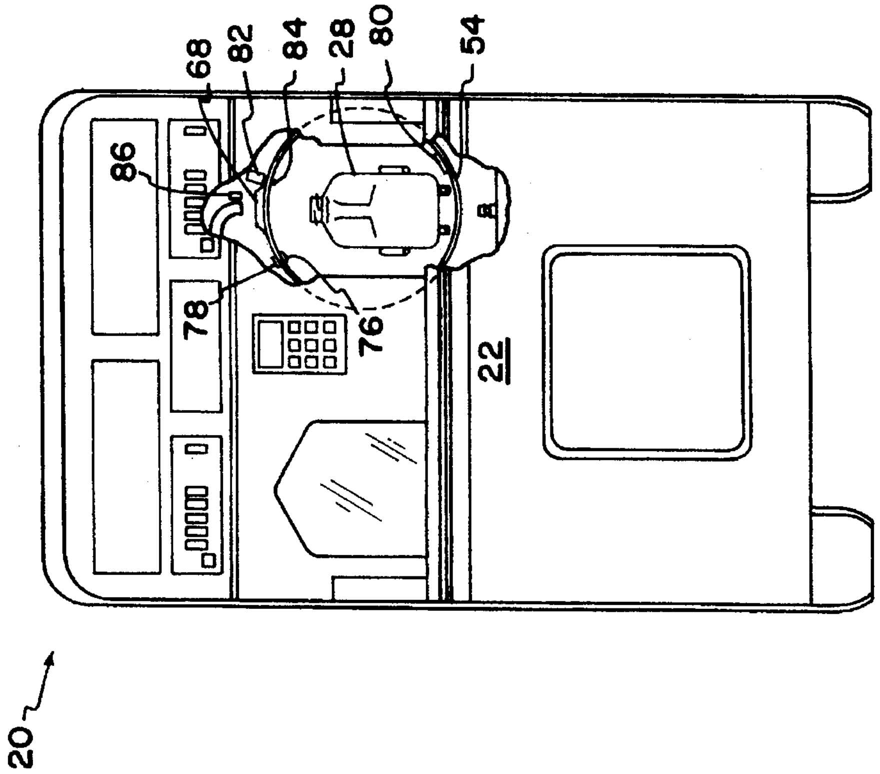

Once filling is complete, the microprocessor signals the proximity switch 82 to return to the cabinet 22, out of the opening 84 in the drum 54, and signals the lift 66 to move the fork 62 downward to its initial position, as shown in FIG. 6. By the time the neck of the container 28 has been moved out of engagement with the drum opening 68, the fork 62 has moved to its lowest position on the track 64, which is detected by the bottom reed switch 102 (FIG. 7) which signals the microprocessor, such that the door 30 of the compartment 26 opens, and the filled container 28 may now be removed. Should any step of this process malfunction, the microprocessor will activate the alarm (not shown), which will light the alarm plaque 39 on the indicator panel 36.

The cycle is now complete and a new container may be placed into the compartment 26 for washing and filling. While this operational cycle has been illustrated in the second compartment 26, the first compartment 24 includes the identical structure and functions in an identical manner. Additionally, the cycle may be performed semi-automatically or manually if so desired, as manual components, well known to those skilled in the art, could be substituted for nearly all of the automated components.

Figure 8A:
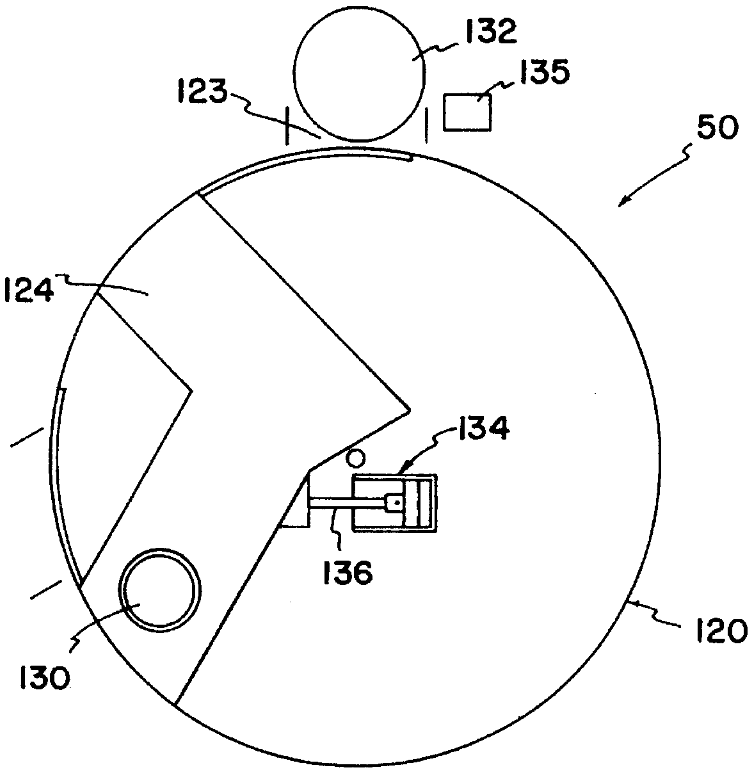

FIGS. 8*a*–8*d* show one of the two identical cap washing units (cap washers) 50 of the invention in operation. Each cap washer 50 can operate in conjunction with or independently of the container washing and filling cycle. In all of these figures, the cap washer 50 includes a drum 120, with a spray nozzle opening 122 for accommodating a conventional spray nozzle (not shown), the spray nozzle being sized to fit within the spray nozzle opening 122, an opening 123, and a pathway 124, including portions 126, 128 for receiving the cap and washing the cap, and an opening 130 permitting water to contact the cap 132, when aligned with the spray nozzle (not shown), during spraying. In FIG. 8*a*, the cap washer 50 is shown immediately prior to the drum 120 being moved by an air cylinder 134, which activates in response to a signal from the microprocessor 430 (FIG. 10), which has received a signal from a photo eye light sensor 135 that the cap 132 has been placed into the cap washer 50 and is resting directly above the drum 120.

Figure 8B:
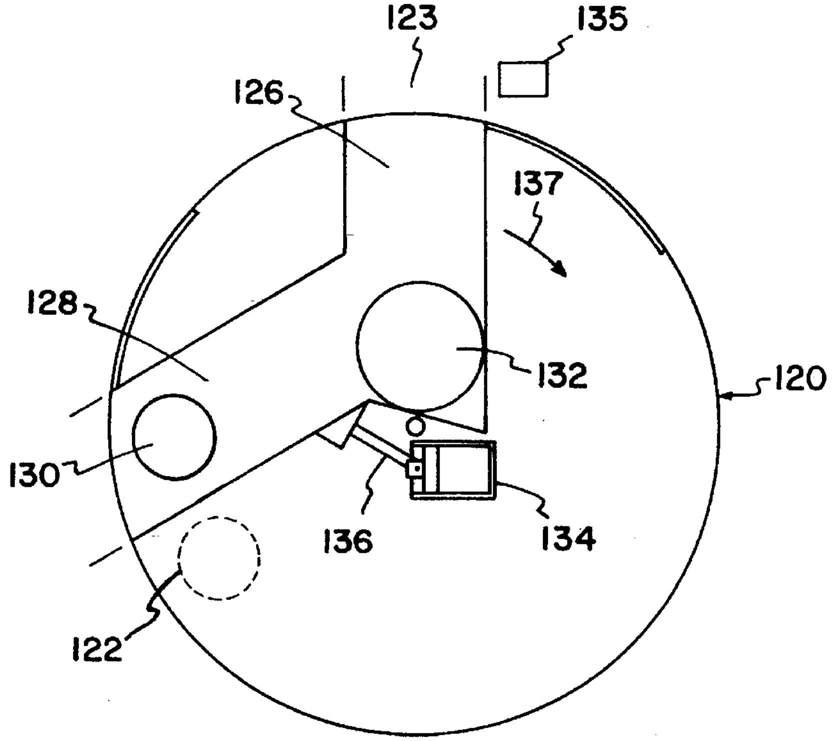
Figure 8C:
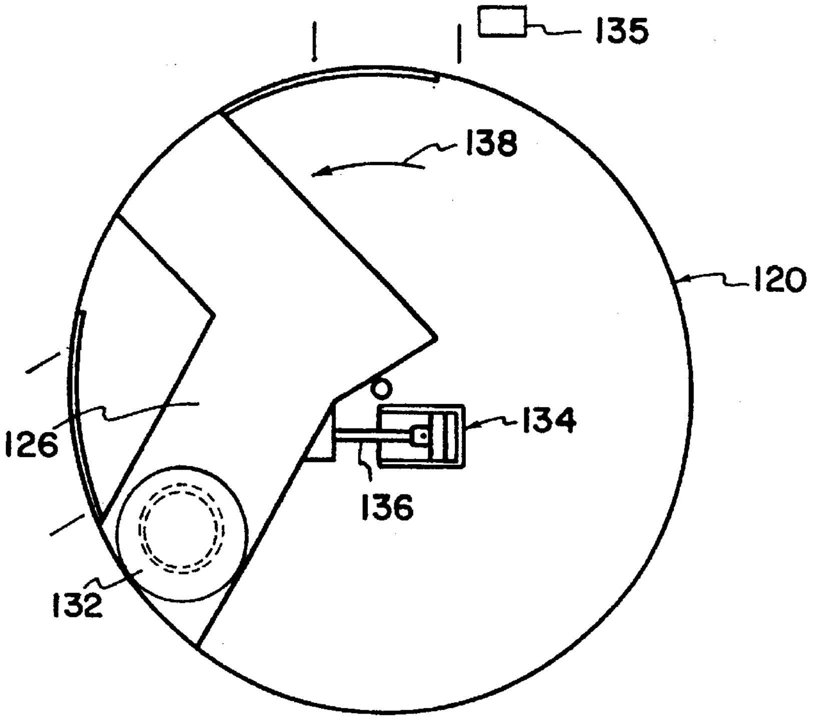
Figure 8D:
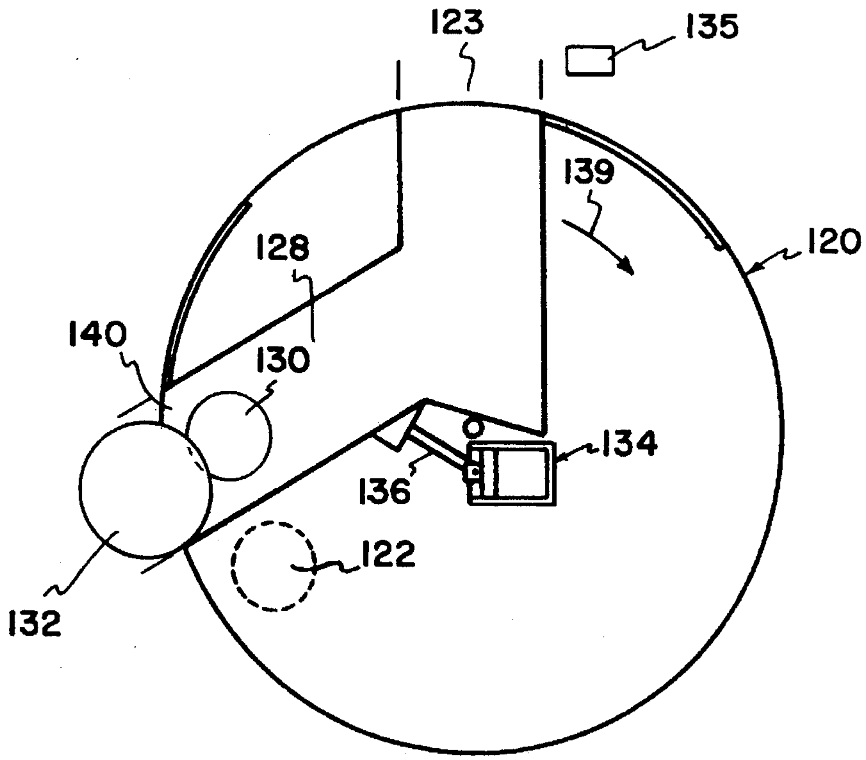

Once the cap 132 is in the receiving portion 126 of the pathway 124 of the drum 120, the piston 136 in the air cylinder 134 has expanded (rotating the drum 120 in the direction of the arrow 137), as shown in FIG. 8*b*. The cap 132 is then moved to the washing portion 128 of the pathway 124, as the piston 136 contracts, rotating the drum 120 (in the direction of the arrow 138), and the microprocessor activates the spray nozzle (not shown), as illustrated in FIG. 8*c*. Once washing is complete, after a predetermined time has lapsed, the microprocessor signals the piston 136 to expand, rotating the drum 120 (in the direction of the arrow 139), and moving the pathway 124 into line with an opening 140. The cap 132 is released, as shown in FIG. 8*d*. This cycle is preferably controlled by a software program, such as that described in accordance with FIG. 12 below.

FIG. 9 is a schematic diagram of the various internal water flow components of the apparatus of the invention. The apparatus has various interconnected systems. These systems include a water inlet system, a purification system, container and cap washing systems, filling systems, an auxiliary function system, a mineralization system, and an ozonating system. These systems are coordinated by the microprocessor 430 (FIG. 10), capable of running several software programs (FIGS. 11–13) for proper operation of the apparatus.

Water from a supply source, such as city water, initially enters the inlet system at the inlet 202 and the inlet line 204. Preferably, the source water has been treated with a water softener. The water next flows through a ball valve 206 followed by a screen 208 and then a back flow preventer 210. The water then flows through an activated charcoal filter 212 and a prefilter 214, preferably used to remove any particles over three microns. While this valve and filter arrangement is preferred, it could be permuted in a multitude of ways, while maintaining proper functioning of the apparatus.

The water then moves through an inlet solenoid valve 216 and an inlet pressure regulator 218. The inlet pressure regulator 218 controls the inlet pressure, which is preferably 40 psi, so that downstream operations of the system can be consistent (and thus uniform parts can be used in different machines) even though source water supply pressure may be different at different locations where the apparatus 20 is installed. The inlet solenoid valve 216 is controlled by the microprocessor. The inlet line 204 terminates in a carrier line 220 in a monitor unit 222.

One portion of the carrier line 220 transports water to the purification system and initially water enters the pump unit 224, which is preferably activated and controlled by the microprocessor, through an inlet 226. Water also enters the pump unit 224 through a second inlet 228 to the pump unit 224 from a recycle line 268, detailed below. The pump unit 224 shown here is described in greater detail in FIG. 14. This pump unit 224 pressurizes the water to about 250 psi, to provide the necessary pressure for reverse osmosis treatment. While the preferred pump unit 224 is described below (FIG. 14), other suitable pumps capable of generating 250 psi for reverse osmosis may be used.

Water exits the pump unit 224 through a feed line 230 to which is a pressure gauge 232 is attached. This feed line 230 terminates in the first of three reverse osmosis units 234, 236, 238 which are plumbed in parallel. Each reverse osmosis unit 234, 236, 238 includes lines 240, 242,244 for carrying purified water therefrom and into a common carrier line 246, while the first reverse osmosis unit 234 and second reverse osmosis unit 236 include waste water lines 248, 250 which carry the unpurified water or concentrate to the second reverse osmosis unit 236, and the third reverse osmosis unit 238, respectively for purification. The concentrate remaining after treatment in the third reverse osmosis unit 238, exits the unit through a high pressure line 252, whose pressure is monitored by a pressure gauge 254.

The preferred reverse osmosis units are disclosed in U.S. patent application Ser. No. 07/947,125, now U.S. Pat. No. 5,427,682, which is incorporated by reference herein. Other reverse osmosis units such as a Model No. E-2200-98, from FloCovery Systems, Inc., 9137 West 69th Street, Eden Prairie, Minn. 55344 may also be used. Alternately, a nano-filter or ultra-filter may be used in place of these reverse osmosis units 234, 236, 238.

The portion of the carrier line 220, not leading to the pump unit 224 includes a pressure gauge 256, a reverse osmosis sensor 258 and a check valve 260, before terminating in a plumbing block 262. The reverse osmosis sensor 258 detects the presence of incoming water and signals the microprocessor, which in turn activates the pump unit 224 for generating at least 250 psi requisite for treatment in the reverse osmosis units 234, 236, 238. This portion of the carrier line 220 is detailed below in conjunction with the common carrier line 246.

The high pressure line 252, extending from the reverse osmosis unit 238, terminates in three branches, a drain line 264, an access line 266 and a recycle line 268. The drain line 264, is regulated by a needle valve 270, and includes a flow meter 272 before ultimately terminating in a sump system/drain 274. The access line 266 terminates in a needle valve 276, which allows access to the systems of the apparatus, such that chemicals can be placed into the high pressure line 252 for cleaning the apparatus.

The recycle line 268 carries concentrate back to the pump unit 224 through the second inlet 228 for purification. A needle valve 278 and a check valve 280, set at predetermined flow rates, are placed along this recycle line 268.

This recycling of a portion of the concentrate allows the reverse osmosis membranes to be more efficient because it increases the flow rate and hence the velocity of the water in the reverse osmosis units 234,236 and 238, which prevents the membranes from getting plugged as easily. Alternatively, the concentrate could all be sent to the drain line 264 and more source water used in a single pass. However, this would substantially decrease the amount of purified water produced compared to the source water used. In many localities, water conservation requirements would prohibit such a waste of water. In a preferred embodiment, the needle valves 270, 278 are adjusted so that the flow of inlet source water is 3 gallons per minute, the recycling stream in the recycle line 268 is 3 gallons per minute, the waste stream going to the drain line 172 is 0.8 gallons per minute, producing 2.2 gallons per minute of purified water in common carrier line 246.

Lines 240, 242, 244 which carry the purified water terminate in a common carrier line 246 in the monitor unit 222, which extends through the plumbing block 262. A sample valve 282, from which water in the common carrier line 246 may be extracted from the system for sampling, and a check valve 284, are located along this common carrier line 246. This common carrier line 246 preferably also includes a total dissolved solids (TDS) sensor 286, connected to the microprocessor. This TDS sensor 286 is a conductivity meter which detects undissolved ions by conductivity. Once the conductivity goes above a preset level, the microprocessor activates the alarm mechanism in the apparatus 20, in accordance with the system described below in FIG. 10.

The common carrier line 246 extends through the plumbing block 262 to a point where it supplies water for dispensing to the container and cap washing and container filling systems. The common carrier line 246 terminates by branching into a supply line 290, for providing the container washing units 292, 293, cap washing units 294, 295, and container filling units 296, 297 with purified water, and an auxiliary line 300 for providing purified water for auxiliary functions. This portion of the common carrier line 246 is regulated by a solenoid valve 302 which is controlled by the microprocessor, coupled with a check valve 304.

The carrier line 220 connects to the common carrier line 246 within the plumbing block 262. If there is a demand for purified water, water in the common carrier line 246 flows through the open solenoid valve 302 into the supply line 290 or the auxiliary line 300. If not, the solenoid valve 302 is closed and the water builds up sufficient pressure to open the check valve 284, and move through it where it is mixed with source water and recirculation water (water from the recycle line 268). This portion of the carrier line 220, is used as a quality flush system in two instances, when the purification system starts up and when it shuts down.

At the beginning of a cycle, purified water that has been sitting in the system is recycled through the system, just to assure that dispensed water has the highest possible quality. (However, this purified water may be used in the container and cap washing cycles).

At the end of the demand for purified water, the level of impurities in the mixed source water and recirculation water (which is then fed through the pump unit 224 into the reverse osmosis units 234, 236, 238) is reduced before the purification is stopped. This "flushing" operation improves the life of the membranes in the reverse osmosis units 234, 236, 238 because the impurity level in the water left in contact with the reverse osmosis membranes is minimized when the flow of water contacting the membranes has been stopped. Alternately, a separate valve for flushing concentrate from the system may be used. This is achieved by continuing to discharge waste water at the same rate, but substantially cutting down on the flow of source water and making it up with a flow of purified water. For example, the inlet flow may be reduced from 3 gallons per minute to 0.8 gallons per minute when the 2.2 gallon per minute purified water starts flowing through carrier line 220 rather than into the supply line 290 or the auxiliary line 300. After a time, the level of impurities in the feed water to the reverse osmosis units 234, 236, 238, will approach that of the source water.

The supply line 290 feeds a washing line 306, from which other lines branch off from it. This branched washing line 306 supplies purified water to the container washing units 292, 293 and the cap washing units 294, 295. This supply line 290 also supplies water to the container filling units 296, 297. The supply line 290 has a reverse osmosis sensor 308, with a supply demand pressure switch, connected to the microprocessor. This line 290 also includes a bladder tank 312, also known as a hydropneumatic tank, along it.

Washing line 306 carries purified water to the container washing units 292, 293, cap washing units 294, 295 and the container washing units 296, 297 (via top-off lines 346, 347 which are discussed in detail below with the container filing systems). A pressure regulator 314, similar to that described above for the water inlet system, is along this washing line 306, prior to the washing line 306 branching into two sub-lines 316, 317 to carry purified water to each respective container washing unit 292, 293. Along each sub-line 316, 317 are solenoid valves 320, 321 which are microprocessor controlled, and open when washing of the container in the compartments 24, 26 (FIG. 1) is desired.

The washing line 306 delivers purified water to the cap washing units 294, 295. Each cap washing unit 294, 295 is supplied by a sub-line 324, 325, branched off of the washing line 306. Along each sub-line 324, 325 are solenoid valves 328, 329, which are microprocessor controlled, and open when washing of the cap in the respective cap washing unit 294, 295 is desired.

Both the container washing and cap washing units 292, 293, 294, 295, include tanks (not shown) for receiving waste water used in washing the containers and caps. The tanks are connected to the sump/drain system 274.

Additionally, reservoirs holding a sanitizing solution may be placed along each sub-line 316, 317, 324, 325 of the container washing 292, 293 and cap washing units 294, 295. Solution flow from these reservoirs would be controlled by valves coupled with pumps or the like, which would in turn be controlled by the microprocessor. A preferred washing and sanitizing solution is Roccal II sanitizing and deodorizing agent from National Laboratories, mixed at a ratio of one ounce of agent in one gallon of wash water.

The supply line 290 branches into fill sub-lines 332, 333 for supplying purified water to the respective filling units 296, 297. Each of the fill sub-lines 332, 333 includes a solenoid valve 336, 337, controlled by the microprocessor, an activated charcoal filter 340, 341 and a flow restrictor 342, 343. These flow restrictors 342, 343 can be set to a fixed limit, such as three gallons per minute, so that the microprocessor controls the filling step. The microprocessor normally includes preset times in proportion to container volumes to yield a consistent volume of dispensed water.

Typically, the water flow from the fill sub-lines 332, 333 is a fast fill, which alone does not normally fill the container, for the fast fill rate causes water to splash out of the container such that the container is not as full as it could be. To maximize the level to which the container is filled (so that there is water in the container neck), the top-off lines 346, 347, with microprocessor controlled solenoid valves 348, 349, fill the container at a slower rate than the fast fill rate, so water does not splash out of the container upon filling. These top-off lines 346, 347, are branched from the washing line 306, and connect with the fill sub-lines 332, 333. They are under the control of the pressure regulator 314 for the washing line 306. As a result of the slower top-off fill, the consumer receives a full container.

The auxiliary line 300 supplies purified water for auxiliary uses. Typical auxiliary uses occur when the apparatus 20 is located in a grocery store. Purified water may be supplied for a vegetable mister 352 or other functions such as, ice making equipment, coffee machines, soft drink dispensing machines and the like. This auxiliary line 300 includes a flow meter 354, connected to the microprocessor, for monitoring amounts of purified water supplied to the system, and a backflow preventer 356. The auxiliary line 300 terminates in the sump system/drain 274.

Water flows into the sump system/drain 274, which includes sump pumps 358, 359, and sump sensors 360, 361, 362, both preferably connected to the microprocessor, for controlling the sump pumps 358, 359, when a predetermined water level in the sump system/drain 274 has been reached. Water flow into the sump system/drain 274 is controlled along the auxiliary line 300 by a solenoid valve 364, also known as a drain valve, controlled by the microprocessor. There is a gap 366 between the auxiliary line 300 and the sump system/drain 274, which prevents spent water from being returned by suction pressure, to the system through the auxiliary line 300.

This auxiliary line 300 is preferably an on-demand pressurized line. It is constantly pressurized such that once an auxiliary function, such as vegetable misting, or icemaking is activated, the function begins immediately upon activation. The pressure in this auxiliary line is regulated by the bladder tank 312 pressure.

The water which collects in the sump/drain 274 system (including the waste water from the container and cap washing units) can be gathered in a separate reservoir, and through the sump pumps 358, 359 can be distributed for secondary functions such as cooling towers, irrigation, toilets, boiler feeds, and other applications requiring low total dissolved solids (TDS) water.

The bladder tank 312 serves as a reservoir for excess water along the supply line 290. It is preferably sealed from the ambient environment to maintain the integrity of the system as a closed loop. It supplies water to the washing line 306, the fill sub-lines 332, 333, and the auxiliary line 300 to maintain an on-demand water supply. It supplies water to the auxiliary line 300 to even the flow across it. When the internal pressure of the air on one side of the bladder 368 is below the pressure in the line 369 connected to the tank 312, such as when there is no other demand for purified water, purified water will flow into the tank 312. When that pressure drops, such as when a container is being washed or filled, or a cap is being washed, purified water will flow out of the tank 312 to the specific wash or fill line. This purified water from the tank 312 will reach its destination prior to the newly produced purified water. Thus, a time lag between activating the apparatus and washing or filling is eliminated, as washing or filling begins once the apparatus is activated and continues without interruption of water flow, until completion of the desired washing or filling cycle. The supply demand pressure switch in the reverse osmosis sensor 308, senses when the pressure in the bladder tank 312 is so low that additional water needs to be purified, and signals the microprocessor accordingly to activate the apparatus.

The purified water that reaches the filling units 296, 297 is mineralized by a mineralization system. With this mineralization system, a set ratio of minerals may be injected into the purified water. The minerals added are preferably calcium chloride, potassium chloride and magnesium chloride, preferably at a weight ratio of 60:20:20. Preferably, the minerals are in solution form, and are injected at a level so as to bring the level of total dissolved solids (TDS) in the mineralized water up to 100 parts per million (ppm). These minerals not only make the water taste better, but they also make it more healthful for drinking. They also bring the pH of the purified water up to a point where it will not leach minerals or resins from the system or containers. Other minerals may be added or substituted depending on the desired qualities of the dispensed water. Also, flavors or carbon dioxide could be added.

The minerals are preferably provided via a sealed system, such as a collapsible sealed container 372. If the minerals are stored in the cabinet in a reservoir, or are added to the water in a powder or tablet form, there is a problem with airborne bacteria and other containments entering the purified water through the mineral addition system. For example, when minerals are withdrawn from a reservoir, air must enter the reservoir to equalize the pressure. This air could carry contaminants that would then enter the purified water through the mineralization system.

By providing the minerals in a sealed system, bacteria or other airborne contaminants are excluded from the mineral addition system. Instead, the minerals can be prepared off site under sterile conditions and placed into collapsible containers. These containers can then be transported to the site of the apparatus 20, and when the first container is depleted, a second container can be connected. Preferably the mineral container 372 and motorized feed pump 374 are connected by sanitary, snap-on connectors 375. The feed pump 374 is connected to the mineral carrying line 376, which includes a check valve 378. This check valve 378 is opened by pressure from the feed pump 374. For example, the mineral storage container 372 may be a bag or multiple bags-in-box with a spout that accepts tubing. The mineral carrying line 376 connects to the supply line 290 prior to the branching of the fill sub-lines 332, 333, to provide an even mixture of minerals to the purified water.

The purified water is subject to sterilization with ozone ($O_3$) supplied by the ozonation system through a main ozone line 380. Along this main ozone line 380, this system includes an air compressor 382, activated by a signal from the microprocessor, connected to a purifier 384 which is in turn connected to a regulator 386. The compressed air then moves to a dryer 388, preferably a decanter, through a flow restrictor 390 and then to an ozonator 392, which is preferably a 10,000 Volt corona discharge device, also activated by a signal from the microprocessor.

The ozone is then delivered to the container washing sub-lines 316, 317, cap washing sub-lines 324, 325, fill sub-lines 332, 333, the top-off lines 346, 347 (through the fill sub-lines 332, 333), and the auxiliary line 300 by the ozone carrier lines 394, 395, 396, 397, 398, 399, 400 respectively, which branch from the main ozone line 380, when the requisite washing, filling and auxiliary steps are being performed. The ozone distribution along each ozone carrier line 394, 395, 396, 397, 398, 399, 400 is preferably microprocessor controlled, and each ozone carrier line includes solenoid valves 402, 403, 404, 405, 406, 407, 408 and check valves 410, 411, 412, 413, 414, 415, 416.

With additional respect to the ozone carrier lines, 397, 398, which supply the fill sub-lines 332, 333, the solenoid valves 406, 407, along the ozone carrier lines 397, 398, can be opened for ozone to be blown through these fill sub-lines 332, 333 after all filling and topping off is complete. This blowing step further ozonates the water in the container, providing further sanitizing, and eliminates any water from the fill sub-lines 332, 333, inhibiting bacteria growth therein. Additionally, blowing excess water out of the fill sub-lines 332, 333 eliminates dripping in the filling nozzles 70 (FIG. 1).

In FIG. 10, there is shown the preferred system for implementing the present invention. The system includes a microprocessor 430, which is preferably implemented with a General Electric 9030 PLC with 32 inputs and 64 outputs. The microprocessor 430 interfaces with a number of peripheral devices for controlling the various water flow operations of the apparatus, which have been illustrated above in FIGS. 1–9. These peripherals typically include the following.

A display panel peripheral 432 controls the indicator and display panels on the cabinet of the apparatus, including the start button on the indicator panel and the inlet solenoid valve. An automation peripheral 434 controls the automated functions such as closing the compartment door, the safety switch, the drum drive mechanism, lifting the fork, activating the cylinder which rotates the drum of the cap washing unit, and raising and lowering the proximity switch. A peripheral for automation sensors 436 controls the light and magnetically activated sensors, including the light beam sensor unit, the fiber optic photo eye sensor, the reed switches, the proximity switch, and the rotate top and rotate bottom sensors, and the photo eye light sensor of the cap washing unit. There is also a peripheral 438 for controlling the alarm and monitors, i.e., the TDS monitor.

A peripheral 440 controls the sump sensors and there is a sump pumps peripheral 442 for the sump pumps, and the drains fed by the drain line and the auxiliary line. There is a drain valve peripheral 443 for controlling the solenoid valve (drain valve) on the auxiliary line.

A reverse osmosis sensor peripheral 444 controls the two reverse osmosis sensors of the apparatus. The reverse osmosis peripheral 446 controls the pump unit which feeds water at the requisite pressure to the reverse osmosis units associated therewith. Similarly, the Ozonation System is controlled by an ozone peripheral 448 which signals the air compressor and ozonator.

The container wash peripheral 450 signals the inlet solenoid valve, the solenoid valve along the common carrier line, and the solenoid valves along the container washing sub-lines, along with those on the ozone carrier lines, which supply ozone to these container washing sub-lines. The cap wash peripheral 452 signals the inlet solenoid valve, the solenoid valve along the common carrier line, the solenoid valves along the cap washing sub-lines, along with those on the ozone carrier lines, which supply ozone to these cap washing sub-lines. The container fill peripheral 454 signals the inlet solenoid valve, the solenoid valve along the common carrier line, the solenoid valves along the fill sub-lines, the solenoid valves of the ozone carrying lines for the fill sub-lines and the solenoid valves along the top-off lines.

The microprocessor 430 can interface with a standard 486 Computer 456. This computer 456 can in turn be interfaced with a customer interface keypad 46, and a telephone modem 460. This telephone modem 460 may call a remotely located central station which monitors this apparatus, and all of the functions performed by it.

Figure 11A:
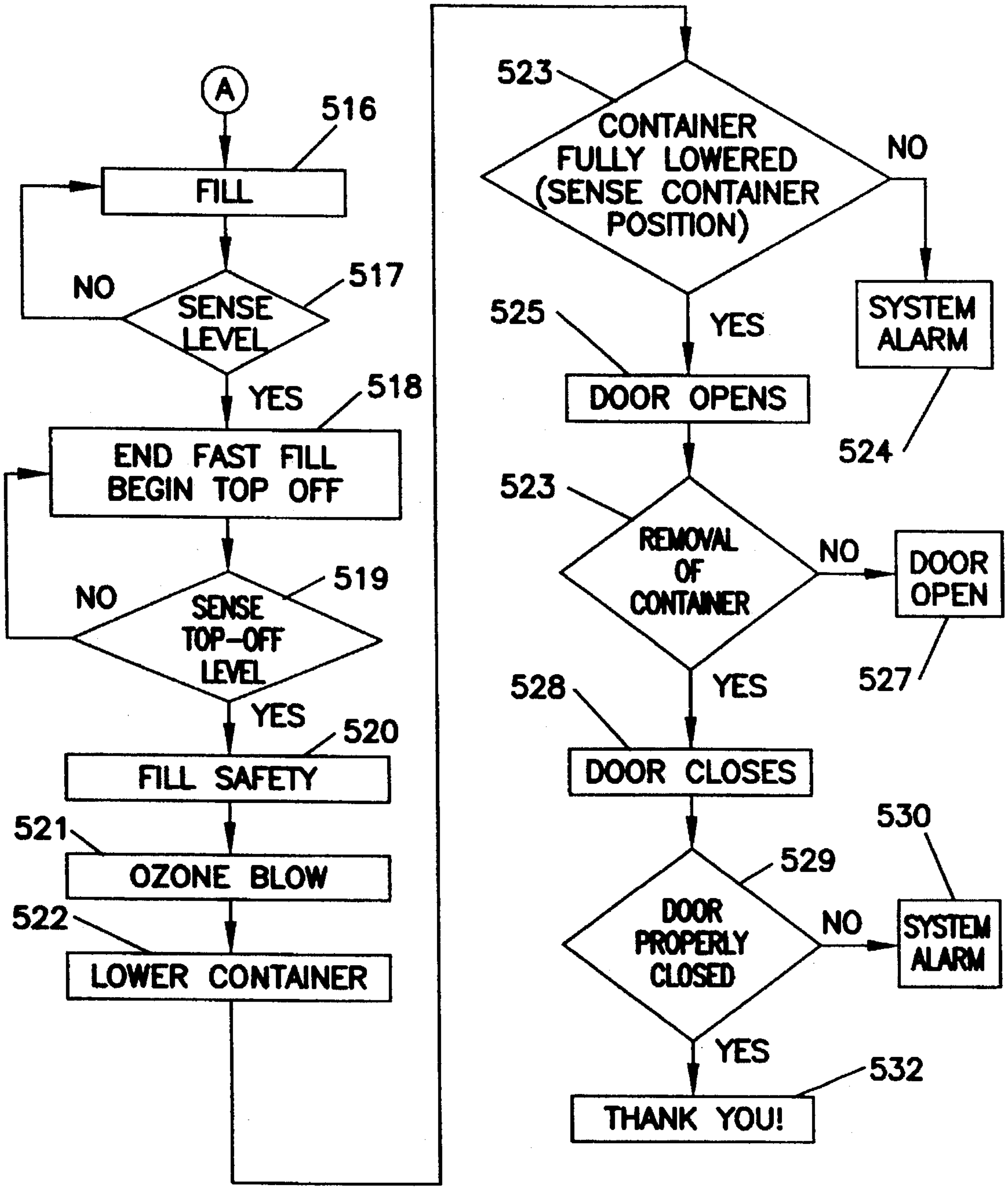

Turning now to FIGS. 11 and 11*a*, there is a flow chart of the embedded software executed by the microprocessor 430 (FIG. 10) in order to run the container washing and filling systems. The microprocessor is preferably implemented with the above mentioned 32 input, 64 output PLC, and one skilled in the art will understand that other microprocessors may be used to execute the software described in the present specification. Upon depressing a start button at step 500, the door opens in accordance with the door opening step 501. A light beam sensor unit at sensing step 503 senses whether or not a container is placed on the fork. If there is no recognition of a container during this sensing step 503, the door closes at a door closing step 504 and the process terminates at step 505.

If a container has been sensed, the door closes at door closing step 506 and the lift is signaled to rise at lift raising step 507. The size (i.e., 1 gallon, 2 gallon, 3 gallon) of the container is then typically sensed at step 508 and the drum is rotated at step 509. At step 510, a rotate bottom sensor determines whether the container has been sufficiently rotated for washing. If not, an alarm activates and a corresponding portion of the indicator panel lights at step 511. The alarm mechanism shuts the apparatus down and the microprocessor signals the modem to place a service call.

Once the container is in the proper position, the solenoid valves controlling ozone flow and water flow to the container washing sub-lines, the solenoid valve on the common carrier line, and the inlet solenoid valve, all open, whereby the container is washed at step 512. This washing step 512 is preferably timed, the times being preset in the microprocessor depending on the size of the container (i.e., 10 seconds for a 1 gallon container to 15 seconds for a 3 gallon container).

Once the container washing is complete, the drum is rotated at step 513 so that its neck is in line with the fill nozzle of the apparatus. This condition is sensed by the rotate top sensor at step 514. If the container is not in line for filling, an alarm activates at step 515, as the alarm plaque of the indicator panel lights up. If the container is in line with the fill nozzle, the solenoid valves on the ozone carrier lines are opened and minerals have entered the supply line, whereby filling begins at filling step 516. The filling in this step is a fast fill, timed in accordance with times preset into the microprocessor dependent upon the size of the container, approximately 19 seconds for each gallon to be filled. Once the water level in the container is sensed by the proximity switch at step 517, if the fill has reached the requisite level, the fast fill is shut off at step 518. If this level has not been reached, filling continues and the level sensing step 517 is repeated until the predetermined level is attained, or until the predetermined filling time lapses. Topping off the container begins at step 518 as the container is filled at a slower rate. The top-off concludes when the photo eye sensor detects attainment of a predetermined water level in the container at step 519. If this predetermined level has not been detected, steps 518 and 519 are repeated until the predetermined level is reached. The microprocessor then signals the solenoid valves along the top-off lines to close at step 520. Alternately, this topping off may be over a predetermined time.

At this point, an optional step 521 of blowing ozone into the filled container may occur. This newly introduced ozone further sanitizes the container and purifies the water. Additionally, the ozone blowing through the filling unit sub-lines serves to sanitize the lines by blowing out water remaining therein. This prevents stagnant water formation, thus inhibiting any bacteria growth therein, and preventing dripping in the filling nozzle.

Once the filling process and/or optional ozone blowing step 521 is complete, the container is typically lowered at step 522. The bottom reed switch at step 523 then senses whether the bottle has been fully lowered, such that the fork is at its lowest possible position on the track. If the lift has not reached this position, the alarm procedure described above occurs at step 524.

Once the lift reaches this position, the compartment door typically opens at step 525. A light beam sensor at step 526 senses whether the container has been removed. If the container has not been removed, the door remains open at step 527. If the container has been removed, the door closes at step 528. A safety switch senses the door closure position at step 529 and if the door is not properly closed, the alarm procedure described above occurs at step 530. If the door has properly closed, the apparatus at step 532 generates a signal such as a lit plaque saying "Thank You", recognizable to the consumer.

Turning now to FIG. 12, there is a flow chart of embedded software executed by the microprocessor 430 (FIG. 10) in order to run the washing system for the cap (cap washing unit or cap washer). At step 550, a cap is placed into the cap washer, which has a photo eye light sensor, for example, for sensing the presence or absence of a cap at step 551.

If a cap has not been sensed in the cap washer, nothing happens at step 552. Once a cap has been sensed in the cap washer, the cylinder controlling the cap washer is preferably signaled to rotate the drum of the cap washer at step 553. A timer is then activated at step 554, which once a preset time has expired, the cylinder rotates the drum of the cap washer downward at step 555, into alignment with a spray nozzle. The cap wash usually involves approximately 10 seconds of spraying time. The ozone and mineralizing valves are now opened and water is sprayed onto the cap for a preset time at step 556.

Once this wash is complete, the system shuts off at step 557. The drum of the cap washer is then rotated upward at step 558 and then downward at step 559 such that the cap can leave the cap washer.

Turning now to FIG. 13, there is a flow chart for embedded software executed by the microprocessor 430 (FIG. 10) for auxiliary functions, and in particular, flushing the auxiliary line, as would be associated with the grocery store. In step 570, a predetermined period, e.g. twenty-four hours, is set. At each period, the solenoid valve of the ozone carrier lines feeding the auxiliary line is preferably opened at step 571. The drain valve is open at step 572 such that water remaining in the auxiliary line is forced into the drain.

Within a preset time, e.g., five minutes, at step 573, the ozone solenoid valve then closes at step 574. Similarly, within a preset time, slightly greater than that of the ozone solenoid valve opening, e.g. six minutes, at step 575, the washing valve and drain valve close at step 576, ending this process.

Turning now to FIG. 14, there is shown the pump unit 224 of the invention. The pump unit 224 includes a pump 600 enclosed in a casing 602, having two inlets 226, 228. There is a cavity 604 between the pump unit 224 and the casing 602. The first or lower inlet 226 is incoming water from the carrier line 220 (FIG. 9). The second or upper inlet 228 is for concentrate from the recycle line 268 (FIG. 9). By positioning the first inlet 226 and the second inlet 228 at lower and upper ends of the pump unit 224, respectively, water is constantly in motion around the pump 600. The water enters the pump 600 through an intermediately positioned opening 606. There may be a screen over this opening 606. This water flow from both ends of the pump unit 224 to the opening 606 eliminates any dead space in the casing 602 such that the water cannot become stagnant. This constantly moving water substantially inhibits bacteria growth in the pump unit 224. Additionally, at the lower section of the pump unit 224, the incoming water also serves to cool the pump motor 608. The pump impeller 610 moves the water to an exit port 612 and through the casing 602 to a feed line 230 (FIG. 9) where it has now been pressurized to approximately 250 psi (as well as slightly warmed by the heat of the motor 608) for reverse osmosis.

The pump unit 224 operates on demand and is controlled by the microprocessor. The preferred pump 600 is a Grundfos Model 751S-26 having a 1½ horsepower motor, a length of approximately 42 inches and a width of approximately 3 15/16 inches. It is capable of pumping between 3 and 7 gallons per minute. Alternately, other similar submersible pumps may also be used within the casing 602, provided they can pump water at approximately 250 psi.

While the invention has been described in connection with an embodiment, it will be understood that the invention is not limited to that embodiment. The invention is intended to cover all alternatives, modifications and equivalents as may be included within the spirit and scope thereof, as defined by the appended claims.

What is claimed is:

1. A self-contained water purification and dispensing apparatus operable for washing and filling at least one container, comprising:

a water inlet for connection to a supply source of unpurified water;

a water purification system in communication with the water inlet for removing impurities from the unpurified water to obtain purified water;

means for rotating said at least one container between an upright position and an inverted position, when said at least one container is inserted into said apparatus;

a container washing arrangement in communication with the water purification system, the container washing arrangement including means for directing purified water from the water purification system into said at least one container when said at least one container is in the inverted position; and a container filling arrangement in communication with the water purification system, the container filling arrangement including means for directing purified water from the water purification system into said at least one container when said at least one container is in the upright position.

2. The apparatus of claim 1, additionally comprising means for detecting whether said at least one container is within the rotating means.

3. The apparatus of claim 2, additionally comprising control means in communication with the detecting means for activating the rotating means, when said at least one container is in the rotating means, to rotate said at least one container from the upright position to the inverted position for washing and back to the upright position for filling with purified water.

4. The apparatus of claim 1, wherein the rotating means includes a drum with an opening adapted to receive the neck of said at least one container and a movable platform adapted to fit the bottom of said at least one container, the movable platform for moving between a first position, where said at least one container is out of contact with the drum opening, and a second position, where said at least one container is in contact with the drum opening, whereby said at least one container is received upright on the platform in the first position, the platform is moved to the second position, once in this second position, said at least one container is rotated from the upright position to the inverted position for washing, and once said at least one container is washed, said at least one container is rotated back to the upright position for filling, and once filling is complete said at least one container is returned to the first position.

5. The apparatus of claim 1, additionally comprising a compartment having means for directing purified water from the water purification system for washing a bottle cap placed into the compartment.

6. The apparatus of claim 1, additionally comprising an ozonating system for adding ozone to the purified water.

7. The apparatus of claim 1, wherein the container filling arrangement includes means for filling said at least one container at more than one water flow rate.

8. A process for purifying and dispensing water comprising the steps of:

a) obtaining unpurified water from a supply source and purifying the unpurified water in an apparatus including a water purification system;

b) placing a container in the apparatus in an upright position in a container rotating means;

c) rotating the container to an inverted position;

d) directing the purified water from the water purification system into the container when the container is in the inverted position;

e) rotating the container to an upright position; and f) directing the purified water from the water purification system into the container for filling the container in the upright position.

9. The process of claim 8 additionally comprising, securing the container in the upright position in the container rotation means before rotating the container to the inverted position.

10. The process of claim 9 additionally comprising, releasing the container from the secured engagement once it has been filled.

11. The process of claim 8 additionally comprising, ozonating the purified water in the apparatus.

12. A self-contained water purification and dispensing apparatus operable for washing and filling at least one container, comprising:

a water inlet for connection to a supply source of unpurified water;

a water purification system in communication with the water inlet for removing impurities from the unpurified water to obtain purified water;

means for rotating said at least one container between an upright position and an inverted position, when said at least one container is inserted into said apparatus;

a container washing arrangement in communication with the water purification system, the container washing arrangement including means for directing purified water from the water purification system into said at least one container when said at least one container is in the inverted position;

a container filling arrangement in communication with the water purification system, the container filling arrangement including means for directing purified water from the water purification system into said at least one container when said at least one container is in the upright position; and means for detecting whether said at least one container is within the rotating means.

13. The apparatus of claim 12, additionally comprising control means in communication with the detecting means for activating the rotating means, with said at least one container being in the rotating means, to rotate said at least one container from the upright position to the inverted position for washing and back to the upright position for filling with purified water.

14. The apparatus of claim 12, wherein the rotating means includes a drum with an opening adapted to receive the neck of said at least one container and a movable platform adapted to fit the bottom of said at least one container, the movable platform for moving between a first position, where said at least one container is out of contact with the drum opening, and a second position, where said at least one container is in contact with the drum opening, whereby said at least one container is received upright on the platform in the first position, the platform is moved to the second position, once in this second position, said at least one container is rotated from the upright position to the inverted position for washing, and once said at least one container is washed, said at least one container is rotated back to the upright position for filling, and once filling is complete said at least one container is returned to the first position.

15. The apparatus of claim 12, additionally comprising a compartment having means for directing purified water from the water purification system for washing a bottle cap placed into the compartment.

16. The apparatus of claim 12, additionally comprising an ozonating system for adding ozone to the purified water.

17. The apparatus of claim 12, wherein the container filling arrangement includes means for filling said at least one container at more than one water flow rate.

18. A self contained water purification and dispensing apparatus operable for washing and filling at least one container, comprising:

a water inlet for connection to a supply source of unpurified water;

a water purification system in communication wit the water inlet for removing impurities from the unpurified water to obtain purified water;

means for rotating said at least one container between an upright position and an inverted position, when said at least one container is inserted into said apparatus;

said rotating means including a drum with an opening adapted to receive the neck of said at least one container and a movable platform adapted to fit the bottom of said at least one container, the movable platform for moving between a first position, where said at least one container is out of contact with the drum opening, and a second position, where said at least one container is in contact with the drum opening;

a container washing arrangement in communication with the water purification system, the container washing arrangement including means for directing purified water from the water purification system into said at least one container when said at least one container is in the inverted position; and a container filling arrangement in communication with the water purification system, the container.filling arrangement including means for directing purified water from the water purification system into said at least one container when said at least one container is in the upright position;

whereby said at least one container is received upright on the platform in the first position, the platform is moved to the second position, one in this second position, said at least one container is rotated from the upright position to the inverted position for washing, and once said at least one container is washed, said at least one container is rotated back to the upright position for filling, and once filling is complete said at least one container is returned to the first position.

19. The apparatus of claim 18, additionally comprising means for detecting whether said at least one container is within the rotating means.

20. The apparatus of claim 19, additionally comprising control means in communication with the detecting means for activating the rotating means, when said at least one container is in the rotating means, to rotate said at least one container form the upright position to the inverted position for washing and back to the upright position for filling with purified water.

21. The apparatus of claim 18, additionally comprising a compartment having means for directing purified water from the water purification system for washing a bottle cap placed into the compartment.

22. The apparatus of claim 18, additionally comprising an ozonating system for adding ozone to the purified water.

23. The apparatus of claim 18, wherein the container filling arrangement includes means for filling said at least one container at more than one water flow rate.

* * * * *